United States Patent
Li et al.

(10) Patent No.: US 9,762,421 B2
(45) Date of Patent: Sep. 12, 2017

(54) METHOD AND DEVICE FOR DETERMINING AVAILABLE SPECTRUMS

(75) Inventors: Yuanyuan Li, Beijing (CN); Yeming Tang, Beijing (CN); Wenling Bai, Beijing (CN); Chenggang Jiang, Beijing (CN); Yu Yang, Beijing (CN); Xiaolu Wang, Beijing (CN); Xin Tong, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 436 days.

(21) Appl. No.: 14/239,223

(22) PCT Filed: Aug. 10, 2012

(86) PCT No.: PCT/CN2012/079953
§ 371 (c)(1),
(2), (4) Date: Jun. 24, 2014

(87) PCT Pub. No.: WO2013/023556
PCT Pub. Date: Feb. 21, 2013

(65) Prior Publication Data
US 2015/0163080 A1    Jun. 11, 2015

(30) Foreign Application Priority Data
Aug. 17, 2011 (CN) .......................... 2011 1 0235912

(51) Int. Cl.
*H04L 27/00* (2006.01)
*H04W 16/14* (2009.01)

(52) U.S. Cl.
CPC ......... *H04L 27/0006* (2013.01); *H04W 16/14* (2013.01)

(58) Field of Classification Search
CPC ........................... H04L 27/0006; H04W 16/14
See application file for complete search history.

(56) References Cited

U.S. PATENT DOCUMENTS 8,660,079 B2 *   2/2014   Seok ..................... H04W 16/14
                                                              370/329
2007/0253394 A1   11/2007   Horiguchi et al.
(Continued)

FOREIGN PATENT DOCUMENTS

CN       1832613 A      9/2006
CN     101800999 A      8/2010
(Continued)

OTHER PUBLICATIONS

International Search Report for PCT/CN2012/079953, ISA/CN, Beijing, mailed Nov. 22, 2012.
(Continued)

*Primary Examiner* — Ian N Moore
*Assistant Examiner* — Justin T Van Roie
(74) *Attorney, Agent, or Firm* — Harness, Dickey & Pierce, P.L.C.

(57) ABSTRACT

A method and device for determining available spectrums is disclosed in embodiments of the present invention. By applying the technical solution of the embodiments of the present invention, with consideration on the bi-directionality of the interference between wireless communication systems, when introduction of the cognitive system is required, the corresponding frequency will be determined as an available frequency only in the case the incumbent system and the cognitive system can be simultaneously guaranteed to meet the corresponding coexistence criterion among the corresponding frequency and adjacent frequencies thereof, thus ensuring that the determined available frequency band guarantees that the normal operation of the incumbent system is not interfered by the cognitive system while ensuring that the newly-introduced cognitive system can also operate normally without interference of the incumbent
(Continued)

system, thereby improving the communication quality of the wireless communication systems.

9 Claims, 6 Drawing Sheets

(56) References Cited

U.S. PATENT DOCUMENTS

| | | | | |
|---|---|---|---|---|
| 2008/0171565 A1* | 7/2008 | Shan | ................... | H04W 16/14 455/501 |
| 2010/0330919 A1* | 12/2010 | Gurney | ............... | H04W 52/367 455/67.11 |
| 2011/0003610 A1* | 1/2011 | Key | ................... | G06F 19/3418 455/509 |
| 2011/0013571 A1 | 1/2011 | Sawai | | |
| 2011/0164580 A1 | 7/2011 | Keon | | |

FOREIGN PATENT DOCUMENTS

| | | | | |
|---|---|---|---|---|
| CN | 102355671 A | 2/2012 | | |
| EP | 1096730 A1 | 5/2001 | | |
| KR | WO 2011030960 A1 * | 3/2011 | ............ | H04W 16/14 |
| WO | 2011/008032 A2 | 1/2011 | | |

OTHER PUBLICATIONS

English Translation of Chinese Office Action for Application No. 201110235912.3, dated Jun. 5, 2013.
English Translation of Chinese Office Action for Application No. 201110235912.3, dated Dec. 26, 2013.
European Search Report for Application No. 12823722.9, dated Dec. 10, 2014.

* cited by examiner

METHOD AND DEVICE FOR DETERMINING AVAILABLE SPECTRUMS

CROSS REFERENCE TO RELATED APPLICATIONS

The present application is a U.S. National Phase application under 35 U.S.C. §371 of International Application No. PCT/CN2012/079953, which claims priority to the Chinese patent application No. 201110235912.3 entitled "METHOD AND DEVICE FOR DETERMINING AVAILABLE SPECTRUMS" filed in Chinese Patent Office on Aug. 17, 2011, which applications are incorporated herein by reference in their entirety.

FIELD

The present invention relates to the technical field of communications, and more particularly, to a method and device for determining available spectrums.

BACKGROUND

Radio communication spectrum is a valuable natural resource. With the rapid development of wireless communication technology, the problem of poor spectrum resources is becoming increasingly serious, in order to relieve the current situation of constrained spectrum resources, relevant departments and agencies monitor and study the wireless communication spectrum, finding that some frequency bands (such as television frequency bands) are not used during most time or in most areas, while simultaneous competition on some frequency bands among multi-user & multi-system occurs. That is to say, some systems with a very large traffic load do not have enough spectrum resources, while other systems with a small traffic load occupy too many resources.

The concept of Cognitive Radio is just generated in this background, and its basic idea is: under the premise of causing no interference to incumbent systems, a cognitive system can dynamically select a white space frequency band to conduct communications by monitoring the change of the current radio environment.

Protection of the incumbent systems against interferences is a basic premise of the cognitive system's opportunistic usage of the white space band of the incumbent systems, and such protection includes essentially two aspects:

(1) The cognitive system accurately determines the frequency bands of which incumbent systems are available white space frequency bands (the introduction of the cognitive system on these frequency bands does not affect normal operation of the incumbent systems).

(2) When the occupied frequency bands are no longer available, the cognitive system needs to concede these frequency bands to the incumbent systems timely.

There are primarily three methods for protecting the incumbent systems:

Method I. Database Method

In the current cognitive radio standard studies, the database method acquires more approval. Taking the FCC (Federal Communications Commission) standard as an example, when the incumbent system is a broadcast television system, the incumbent system's information database needs to provide information, including:

A. Geographic coordinates of base stations, e.g., the longitudes and latitudes specified in NAD83 (North American Datum in 1983);

B. Channel numbers (i.e., the used frequency bands) of TV (television);

C. Effective Radiated Power;

D. HAAT (Height Above Average Terrain) of transmission antennas;

E. Horizontal directional patterns of transmission antennas (only for directional antennas);

F. Inclination angles and clockwise azimuths from the due north direction of the antennas; and G. Call signs of radio stations.

The database may be placed in a separate server or directly placed in a base station of a cognitive system and timely updated according to the change of the radio environment, and a cognitive base station may determine which frequency bands of the incumbent systems are available using various information in the database in combination with the physical location of the base station itself (which is acquired by a GPS or Beidou navigation satellite system module) and other information.

Method II. Cognitive Method

In the cognitive method, the base station of the cognitive system detects the signal strength of the incumbent system on a certain frequency band by a sensing algorithm, when the signal strength is greater than a threshold value, then the distance between this base station and the incumbent system using this frequency band is considered to be too close, and introduction of the cognitive system on this frequency band will affect the normal operation of the incumbent system, thus this frequency band is thus unavailable.

Method III. Method of Combining Database Method and Cognitive Method

The method of combining the database method and the cognitive method combines the advantages of both methods: for the system whose white space frequency bands have a certain regularity, the database method may operate better; but when the cognitive base station cannot connect to the database or the incumbent system information in the database is incomplete, the cognitive method may play a flexible and effective supplemental role.

In either method, acquisition of the isolation distance between the cognitive base station and the incumbent system and comparison of the isolation distance with a tolerable threshold value is critical.

As shown in FIG. 1, it is a schematic diagram of interference of the wireless cognitive technology in the prior art, where a BS tower is a transmission tower of an incumbent system, a BS receiver is a fixed receiving device of the incumbent system, and cognitive radio is a transmission (receiving) device of the cognitive system. It can be seen that during a co-channel or adjacent-channel operation, the transmission (receiving) device of the cognitive system needs to be spaced from the receiving device of the incumbent system by a certain distance to ensure the normal operation of the incumbent system, i.e., Link 1 in the figure cannot be too strong.

In the implementation process of the present invention, the inventor has found that at least the following problems exist in the prior art:

All the above three methods only take into account the interference of the cognitive system to the incumbent system without considering the interference of the incumbent system to the cognitive system (i.e., the link shown in dashed lines in FIG. 1), and thus the normal operation of the cognitive system cannot be guaranteed.

As can be seen from this, the existing methods for determining available white space spectrums of the incumbent system only take into account the interference of the cognitive system to the incumbent system without considering the interference of the incumbent system to the cognitive system, and thus, the "white space spectrums" detected by such methods are not necessarily truly available.

For example, when the incumbent system is a digital broadcasting system and the cognitive system is a TD-LTE (Time Division Long Term Evolution) system, the interference of transmission tower of the digital broadcasting system to the base station of the TD-LTE system is very large, the distance isolation requirement between the two systems will be much stricter than the distance isolation requirement for only protecting the digital broadcasting system, and the TD-LTE system is completely inoperable on the "white space spectrums" determined by the presently available methods.

SUMMARY

The embodiments of the present invention, in one aspect, provide a method for determining available spectrums, which at least includes the following steps:

receiving, by a base station, a request message for introducing a cognitive system on a first frequency sent by a database server;

determining, by the base station, a first distance between the base station and a base station of an incumbent system using the first frequency and second distances between the local base station and base stations of incumbent systems using other frequencies near the first frequency;

determining, by the base station, according to the first distance, whether the cognitive system and the incumbent system operating on the first frequency meet a co-channel coexistence criterion;

if it is determined that the co-channel coexistence criterion is met, determining, by the base station, according to the second distances, whether the cognitive system and the incumbent systems operating on said other frequencies meet a corresponding frequency coexistence criterion; and if it is determined that the corresponding frequency coexistence criterion is met, determining, by the base station, that the first frequency is available and reporting to the database server a response message indicating that the first frequency is an available frequency.

In another aspect, the embodiments of the present invention also provide a base station, which at least includes:

a receiving module, to receive a request message for introducing a cognitive system on a first frequency sent by a database server;

a ranging module, to determine a first distance between the local base station and a base station of an incumbent system using the first frequency and second distances between the local base station and base stations of incumbent systems using other frequencies near the first frequency after the receiving module receives the request message;

a first determination module, to determine whether the cognitive system and the incumbent system operating on the first frequency meet a co-channel coexistence criterion according to the first distance determined by the ranging module;

a second determination module, to determine whether the cognitive system and the incumbent systems operating on said other frequencies meet a corresponding frequency coexistence criterion according to the second distances determined by the ranging module after the first determining module determines that the co-channel coexistence criterion is met; and a transmission module, to determine that the first frequency is available and to report a response message to the database server indicating that the first frequency is an available frequency when the second determination module determines that the corresponding frequency coexistence criterion is met.

In yet another aspect, the embodiments of the present invention also provide a method for determining available spectrums, which at least includes the following steps:

sending, by a database server, to a base station a request message for introducing a cognitive system on a first frequency; and receiving, by the database server, a response message returned by the base station and determining whether the first frequency is an available frequency according to contents of the response message.

In still another aspect, embodiments of the present invention further provide a database server, which at least includes:

a transmission module, to send to a base station a request message for introducing a cognitive system on a first frequency;

a receiving module, to receive a response message returned by the base station; and a determination module, to determine whether the first frequency is an available frequency according to contents of the response message.

DETAILED DESCRIPTION

As described in the background art, in the cognitive radio technology, it is a key point how to accurately determine whether a certain spectrum of the incumbent system can currently be used by the cognitive system, there're three main determination methods at present: a database method, a cognitive method and a method of combining the database method and the cognitive method, but these three methods are all from the point of view of protecting the incumbent system without considering the protection of the cognitive system. Since the interference between the wireless communication systems is bi-directional, the incumbent system can also interfere with the cognitive system, introduction of the cognitive system on the available frequency bands determined using the existing methods can only guarantee that the normal operation of the incumbent system will not be affected, but cannot ensure that the newly-introduced cognitive system can also operate normally.

To overcome such defects, embodiments of the present invention provide a determination method for available spectrums, when introduction of the cognitive system is required, the corresponding frequency will be determined as an available frequency only in the case the incumbent system and the cognitive system can be simultaneously guaranteed to meet the corresponding coexistence criterion among the corresponding frequency and adjacent frequencies thereof, thus ensuring that both the incumbent system and the cognitive system can operate normally without interference.

Figure 1:
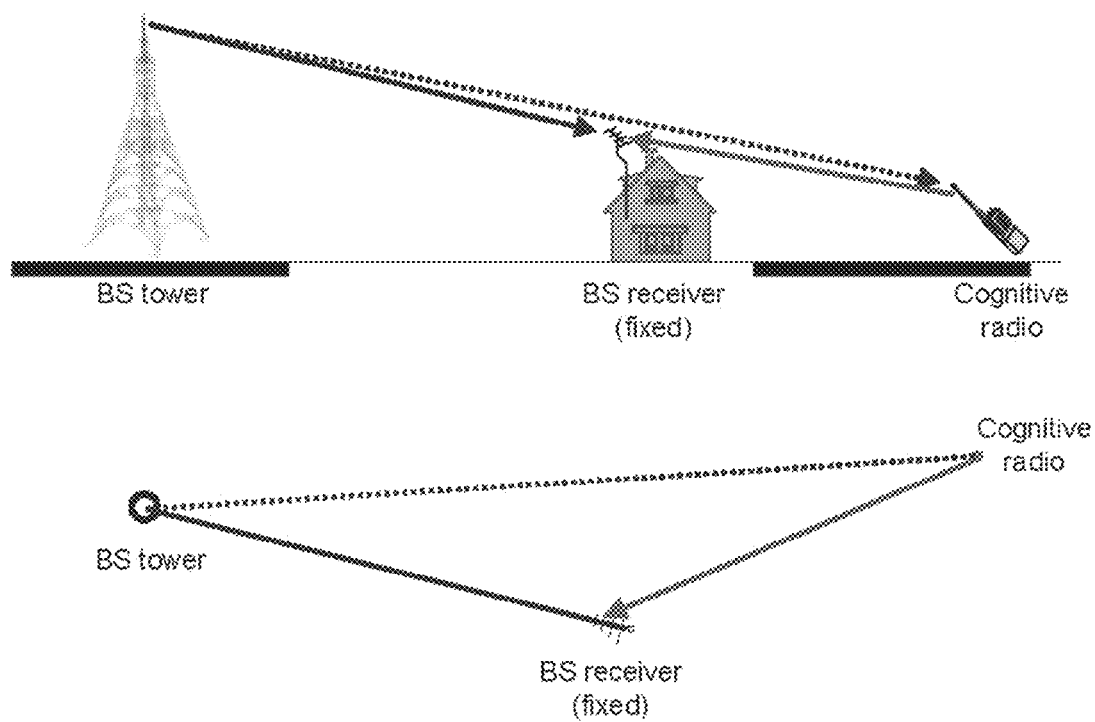
FIG. 1 is a schematic diagram of interference of the wireless cognitive technology in the prior art.
Figure 2:
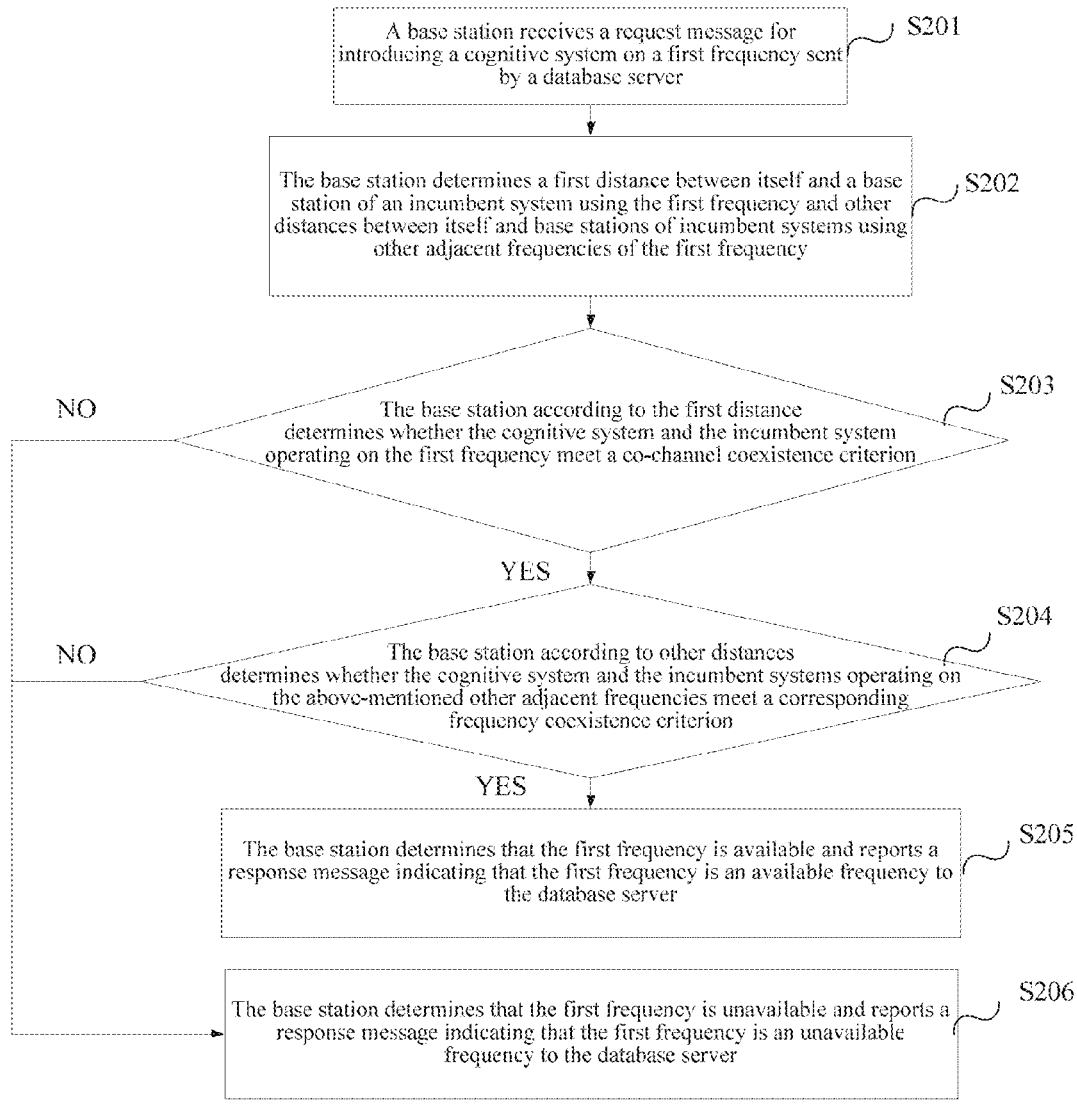
FIG. 2 is a flow diagram of a method for determining available spectrums proposed in embodiments of the present invention.

As shown in FIG. 2, which is a flow diagram of a method for determining available spectrums proposed in the embodiments of the present invention, the method specifically includes the following steps:

Step S201: A base station receives a request message for introducing a cognitive system on a first frequency sent by a database server.

Step S202: The base station determines a first distance between itself and a base station of an incumbent system using the first frequency and other distances between itself and base stations of incumbent systems using other adjacent frequencies of the first frequency.

In practical application scenarios, the above described other adjacent frequencies may specifically include adjacent frequencies of the first frequency and/or secondary-adjacent frequencies of the first frequency and more other adjacent frequencies. In specific implementation scenarios, the quantity and level of other adjacent frequencies whose availability is to be determined may be specifically determined according to practical requirements, such variations do not affect the protection scope of the present invention.

Step S203: The base station, according to the first distance, determines whether the cognitive system and the incumbent system operating on the first frequency meet a co-channel coexistence criterion.

If it is determined that the co-channel coexistence criterion is met, i.e., both the cognitive system and the incumbent system operating on the first frequency can operate normally, then Step S204 is to be performed.

If it is determined that the co-channel coexistence criterion is not met, i.e., not both the cognitive system and the incumbent system operating on the first frequency can operate normally, then Step S206 is to be performed.

Further, for a more accurate implementation of frequency availability determination, the base station may further carry out availability detection on other frequencies near a target frequency given that the availability of the target frequency (i.e., the above first frequency) is determined, and the target frequency is determined to be available only in the case that both the target frequency and other frequencies near the target frequency can ensure the normal operation of the incumbent system and the cognitive system (meeting the corresponding coexistence criterion).

Step S204: The base station, according to the above-mentioned other distances, determines whether the cognitive system and the incumbent systems operating on the above-mentioned other adjacent frequencies meet a corresponding frequency coexistence criterion.

If it is determined that the corresponding frequency coexistence criterion is met, i.e., both the cognitive system and the incumbent systems operating on other adjacent frequencies can operate normally, then Step S205 is to be performed.

If it is determined that the corresponding frequency coexistence criterion is not met, i.e., not both the cognitive system and the incumbent systems operating on other adjacent frequencies can operate normally, then Step S206 is to be performed.

Step S205: The base station determines that the first frequency is available and reports a response message indicating that the first frequency is an available frequency to the database server.

Step S206: The base station determines that the first frequency is unavailable and reports a response message indicating that the first frequency is an unavailable frequency to the database server.

In the above technical solution, the methods used by the base station to determine the first distance between itself and the base station of the incumbent system using the first frequency and other distances between itself and the base stations of the incumbent systems using other adjacent frequencies of the first frequency specifically include the following three schemes:

Scheme I. The base station, based on signal power sensing, determines the first distance and other distances between itself and base stations of incumbent systems using the corresponding frequencies.

Scheme II. The base station, according to information in an information database of a positioning system and the incumbent systems, determines the first distance and other distances between itself and the base stations of the incumbent systems using the corresponding frequencies.

Scheme III. A scheme generated by combining Schemes I and II.

In practical application scenarios, which scheme is applied may be selected according to actual scenario needs, such variations do not affect the protection scope of the present invention.

In practical application scenarios, the co-channel coexist criterion or the corresponding frequency coexistence criterion is specifically:

$$Dcr(n) > MAX(D1, D2);$$

Herein, Dcr(n) represents the distance between the local base station and the base stations of the incumbent system using the frequency n.

D1 represents the distance isolation required for normal operation of the cognitive system when the base station of the incumbent system interferes with the base station of the cognitive system.

D2 represents the distance isolation required for normal operation of the incumbent system when the base station of the cognitive system interferes with the base station of the incumbent system.

To facilitate subsequent spectrum allocation & usage of the base station, after the base station determines that the first frequency is available, a process of saving the first frequency in information of available spectrums is further performed.

It is further noted that, in practical application scenarios, corresponding to the strategy differences of sending the request messages for introducing the cognitive system by the database server, the above processing scheme can have two different application processes which are specifically described as follows:

Scheme I. The Base Station Sequentially Issues Request Messages for Introducing the Cognitive System on Different Frequencies.

After the base station reports the response message indicating that the first frequency is an available frequency or the one indicating that the first frequency is an unavailable frequency to the database server, the database server determines whether there is any other frequency whose availability needs to be determined. If there is, the database server continues to send a request message for introducing the cognitive system on another frequency to the corresponding base station and carries out the availability detection on said another frequency.

Scheme II. The Base Station Issues Request Messages for Introducing the Cognitive System on Multiple Frequencies Altogether.

In this scheme, while receiving the request message for introducing the cognitive system on the first frequency sent by the database server, the base station also receives the request messages for introducing the cognitive system on other frequencies sent by the database server, then, after reporting the response message indicating that the first frequency is an available frequency or the one indicating that the first frequency is an unavailable frequency to the database server, the base station continues to determine whether said other frequencies are available frequencies and feeds back to the database server.

Correspondingly, at the side of the database server, the corresponding request message transmission and reception of the response message are required, thus whether the corresponding frequencies are available frequencies are determined.

Wherein, the request messages for introducing the cognitive system on a single different frequency may be sequentially issued, and after a corresponding response message is received, it is further determined whether there are any other frequency whose availability needs to be determined.

The request messages for introducing the cognitive system on multiple frequencies may also be issued at one time, and then the response message corresponding to each frequency fed back respectively by the base station is received.

Specific processing manners are similar to the above description to which reference may be made, and description thereof will not be repeated.

In contrast to the prior art, the technical solution proposed in the embodiments of the present invention has the following advantages:

By applying the technical solution of the embodiments of the present invention, with consideration on the bi-directionality of the interference between wireless communication systems, when introduction of the cognitive system is required, the corresponding frequency will be determined as an available frequency only in the case the incumbent system and the cognitive system can be simultaneously guaranteed to meet the corresponding coexistence criterion among the corresponding frequency and other frequencies near it, thus ensuring that the determined available frequency band guarantees that the normal operation of the incumbent system is not interfered by the cognitive system while ensuring that the newly-introduced cognitive system can also operate normally without interference of the incumbent system, thereby improving the communication quality of the wireless communication systems.

Next, the technical solution proposed in the embodiments of the present invention is illustrated in connection with specific application scenarios.

The technical solution proposed in the embodiments of the present invention provides a method for determining available white space frequency bands of the incumbent system, which ensures that both the cognitive system and the incumbent system can operate normally when the cognitive system is introduced on these white space frequency bands.

Figure 3:
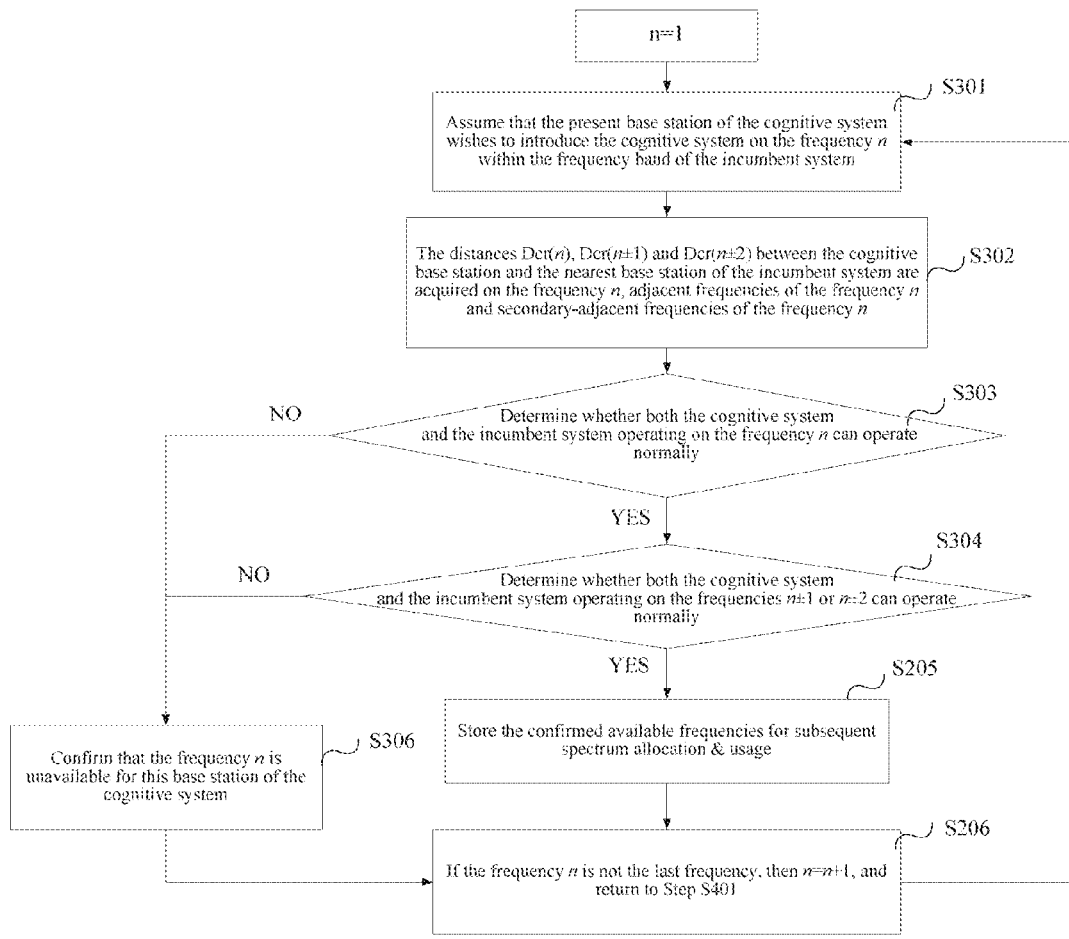
FIG. 3 is a flow diagram of a method for determining available spectrums in a specific scenario proposed in embodiments of the present invention.

As shown in FIG. 3, which is a flow diagram of a for determining available spectrums in a specific scenario proposed in the embodiments of the present invention, in the present embodiment, the description will be made taking sequential sending of the request messages for introducing the cognitive system on a single frequency to the base station as an example, the method specifically includes the following steps:

Step S301: It is assumed that the present base station of the cognitive system wishes to introduce the cognitive system on the frequency n within the frequency band of the incumbent system.

Step S302: The distances $Dcr(n)$, $Dcr(n\pm1)$ and $Dcr(n\pm2)$ between the cognitive base station and the nearest base station of the incumbent system are acquired on the frequency n, adjacent frequencies of the frequency n and secondary-adjacent frequencies of the frequency n.

Specifically, $Dcr(n)$ may be acquired employing the following several methods:

Method I. Cognitive-Based Method

A cognitive detection unit of the base station of the cognitive system measures signal power of an incumbent user and acquires the signal strength of the incumbent system on the frequency n, and path loss between two base stations can be calculated based on parameters such as transmitting power of the base stations and antenna gain of the incumbent system and antenna gain of the cognitive system etc., then $Dcr(n)$ can be calculated based on a path loss model.

Figure 4:
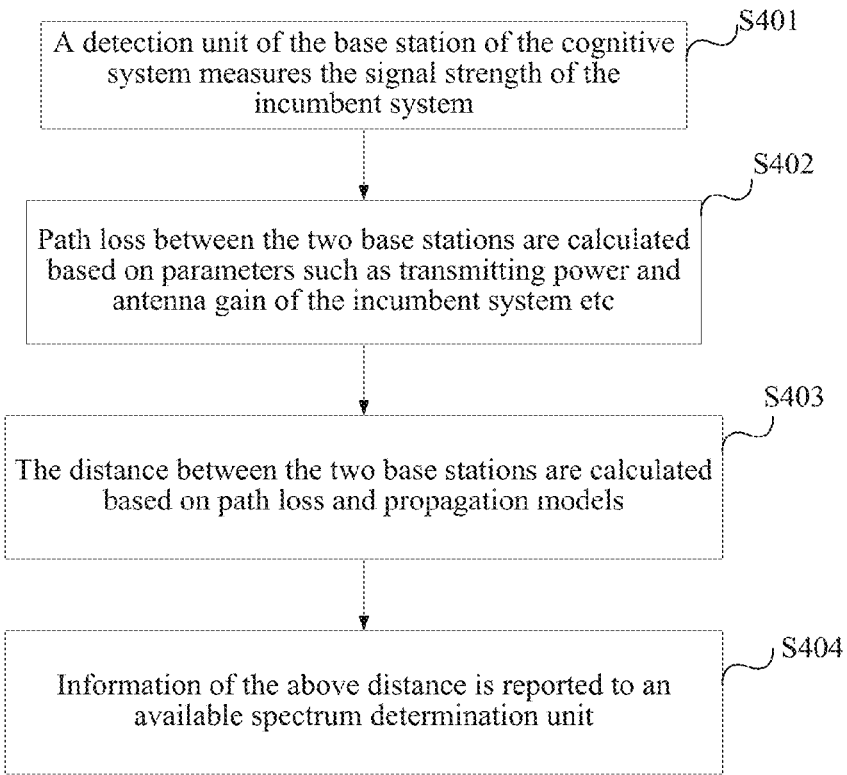
FIG. 4 is a flow diagram of a cognitive-based distance measuring method proposed in embodiments of the present invention.

The specific processing flow diagram of this method is as shown in FIG. 4 and particularly includes:

Step S401: A detection unit of the base station of the cognitive system measures the signal strength of the incumbent system.

Step S402: Path loss between the two base stations are calculated based on parameters such as transmitting power and antenna gain of the incumbent system etc.

Step S403: The distance between the two base stations are calculated based on path loss and propagation models.

Step S404: Information of the above distance is reported to an available spectrum determination unit.

Method II. A Method Based on a System Information Database of a Positioning System and the Incumbent System.

In the current research and standardization process of the cognitive radio technology, the system information database of the incumbent system is required to store base station locations and information of the current operating frequency of each base station of the incumbent system, the base station of the cognitive system can acquire its own geographical location information based on its own positioning system (GPS or Beidou navigation satellite system), and further sends a positioning request to the database to timely acquire exact geographical location information of the base station in the corresponding region of an incumbent system, and finally calculates the distance between the two base stations.

Figure 5:
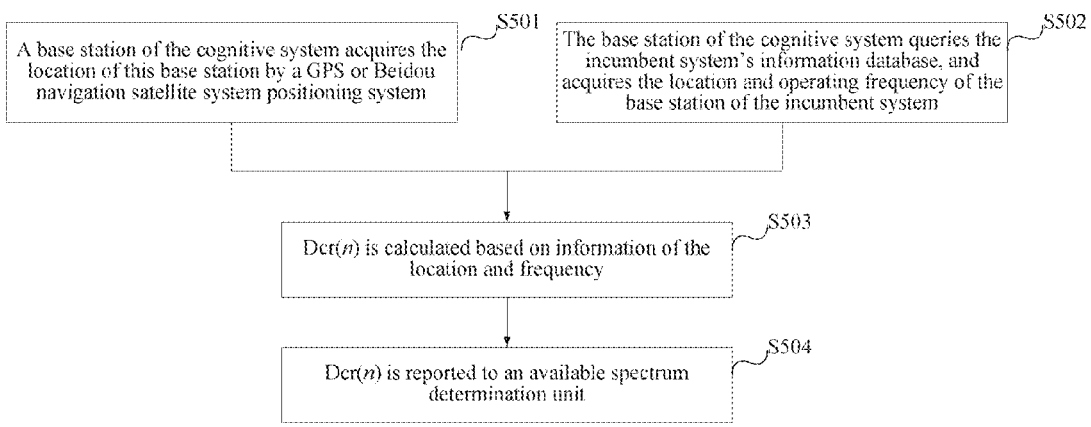
FIG. 5 is a flow diagram of a distance measuring method based on a system information database of a positioning system and an incumbent system proposed in embodiments of the present invention.

The flow diagram of this method is as shown in FIG. 5 which includes the following steps:

Step S501: A base station of the cognitive system acquires the location of this base station by a GPS or Beidou navigation satellite system positioning system.

Step S502: The base station of the cognitive system queries the incumbent system's information database, and acquires the location and operating frequency of the base station of the incumbent system.

Step S503: Dcr(n) is calculated based on information of the location and frequency.

Step S504: Dcr(n) is reported to an available spectrum determination unit.

Method III. The Above Two Methods have their Respective Advantages and May be Used in Combination Depending on Practical Situations.

Further, acquisition methods of Dcr(n±1) and Dcr(n±2) are identical to that of Dcr(n), and description thereof will not be repeated.

Step S303: It is determined, using Dcr(n) and the co-channel coexistence criterion, whether both the cognitive system and the incumbent system operating on the frequency n can operate normally, i.e., it is determined based on Dcr(n) whether the cognitive system and the incumbent system operating on the frequency n meet the co-channel coexistence criterion.

The co-channel coexistence criterion is acquired from mutual interference simulations and actual measurements, generally speaking, when the incumbent system and the cognitive system are in co-channel coexistence, the most severe interference is located between the base stations of the two systems. Assuming that the distance isolation required for normal operation of the cognitive system when the base station of the incumbent system interferes with the base station of the cognitive system is D1, and the distance isolation required for normal operation of the incumbent system when the base station of the cognitive system interferes with the base station of the incumbent system is D2, then the co-channel coexistence criterion is Dcr(n)>MAX (D1,D2).

If the determination result is yes, then Step S304 is to be performed;

If the determination result is no, then Step S306 is to be performed.

Step S304: It is determined using Dcr(n±1), Dcr(n±2) and an adjacent-channel/secondary adjacent-channel coexistence criterion, whether both the cognitive system and the incumbent system operating on the frequencies n±1 or n±2 can operate normally, i.e., it is determined based on Dcr (n±1) and Dcr(n±2) whether the cognitive system and the incumbent system operating on the frequencies n±1 or n±2 meet the adjacent-channel/secondary adjacent-channel coexistence criterion.

The adjacent-channel/secondary adjacent-channel coexistence criterion is acquired from mutual interference simulation and actual measurement, generally speaking, when the incumbent system and the cognitive system are in adjacent-channel/secondary adjacent-channel coexistence, the most severe interference is located between base stations of the two systems. Assuming that the distance isolation required for normal operation of the cognitive system when the base stations of the incumbent system interfere with the base stations of the cognitive system is D1', and the distance isolation required for normal operation of the incumbent system when the base station of the cognitive system interferes with the base station of the incumbent system is D2', then the adjacent-channel/secondary adjacent-channel coexistence criterion is Dcr(n+1)>MAX(D1',D2') or Dcr(n+2) >MAX(D1',D2').

If the determination result is yes, then Step S305 is to be performed;

If the determination result is no, then Step S306 is to be performed.

Step S305: The confirmed available frequencies are stored for subsequent spectrum allocation & usage.

Step S306: It is confirmed that the frequency n is unavailable for this base station of the cognitive system.

After completion of Steps S304 or S305, if the frequency n is not the last frequency, then n=n+1, and return to Step S301.

Figure 6:
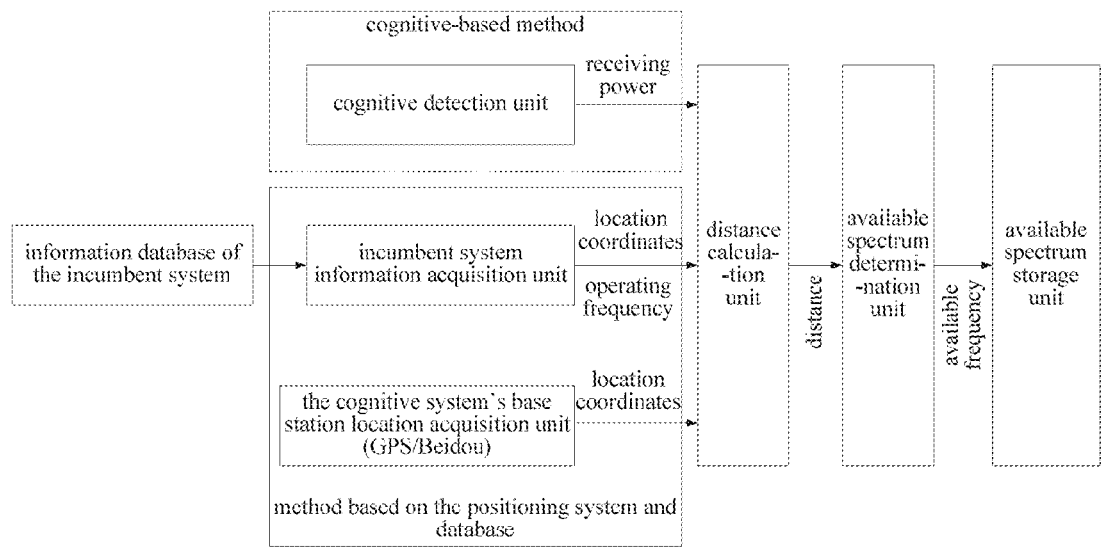
FIG. 6 is a structural diagram of a single cognitive base station proposed in embodiments of the present invention.

As known from the above description, in order to achieve the above technical solution, the corresponding primary hardware units are all located within the base station of the cognitive system, and a structural diagram of a single cognitive base station is shown in FIG. 6.

Wherein, units other than the incumbent system's information database are all located within the base station of the cognitive system, and the incumbent system's information database may be located at one of three places:

It may be located within the base station of the cognitive system, or located on a central control unit of the cognitive system (to be accessed by multiple cognitive base stations), or located in a form of an independent server outside the cognitive system and maintained by a third-party device the access right for which is obtained by the cognitive system through payment.

Specifically, main functions of the units thereof are described below:

A cognitive detection unit is responsible for detecting signal energy of the incumbent system and reporting a detection result to a distance calculation unit.

An information database of the incumbent system is responsible for storing information related with the incumbent system, such as base station locations, transmitting power, antenna configuration, frequency configuration, information of an incumbent system etc.

An incumbent system information acquisition unit is responsible for accessing the information database of the incumbent system, acquiring information required by the distance calculation unit, and delivering the information to the distance calculation unit.

The distance calculation unit, when the cognitive-based method is employed, needs to calculate path loss based on information such as the transmitting power and antenna gain of the incumbent system's base station and receiving power provided by the cognitive detection unit and calculates the distance based on a propagation model; and when the method based on the positioning system and the database is employed, the distance calculation unit needs to calculate the distance based on the location information of the local base station provided by the cognitive system's base station location acquisition unit and the location information of the base station of the incumbent system provided by the incumbent system's information acquisition unit.

An available spectrum determination unit makes a judgment according to the co-channel and adjacent-channel/secondary adjacent-channel coexistence criterion as well as the distance information provided by the distance calculation unit, and sends the acquired available frequencies to an available spectrum storage unit.

The available spectrum storage unit stores frequencies available for the local base station.

Specifically, units involved in the above two different Dcr acquisition methods are as follows:

The cognitive-based method primarily involves the cognitive detection unit and the distance calculation unit.

The method based on the positioning system and the database primarily involves the cognitive system's base station location acquisition unit, the incumbent system's information acquisition unit, the incumbent system's information database and the distance calculation unit.

In contrast to the prior art, the technical solution proposed in the embodiments of the present invention has the following advantages:

By applying the technical solution of the embodiments of the present invention, with consideration on the bi-directionality of the interference between wireless communication systems, when introduction of the cognitive system is required, the corresponding frequency will be determined as an available frequency only in the case the incumbent system and the cognitive system can be simultaneously guaranteed to meet the corresponding coexistence criterion among the corresponding frequency and other frequencies near it, thus ensuring that the determined available frequency band guarantees that the normal operation of the incumbent system is not interfered by the cognitive system while ensuring that the newly-introduced cognitive system can also operate normally without interference of the incumbent system, thereby improving the communication quality of the wireless communication systems.

Figure 7:
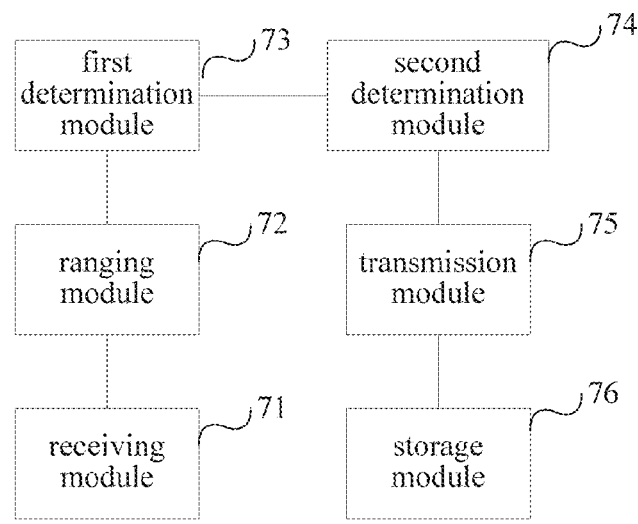
FIG. 7 is a structural diagram of a base station proposed in embodiments of the present invention.

In order to achieve the technical solution of the embodiments of the present invention, the embodiments of the present invention also provide a base station, a structural diagram of which is as shown in FIG. 7 and which at least includes:

A receiving module 71 is adapted for receiving a request message for introducing a cognitive system on a first frequency sent by a database server.

A ranging module 72 is adapted for determining a first distance between the base station and a base station of the incumbent system using the first frequency and distances between the base station and base stations of the incumbent systems using other adjacent frequencies of the first frequency after the receiving module 71 receives the request message.

A first determination module 73 is adapted for determining whether the cognitive system and the incumbent system operating on the first frequency meet a co-channel coexistence criterion according to the first distance determined by the ranging module 72.

A second determination module 74 is adapted for determining whether the cognitive system and the incumbent systems operating on said other adjacent frequencies meet a corresponding frequency coexistence criterion according to said other distances determined by the ranging module 72 after the first determination module 73 determines that the co-channel coexistence criterion is met.

A transmission module 75 is adapted for determining that the first frequency is available and reporting a response message indicating that the first frequency is an available frequency to the database server when the second determination module 74 determines that the corresponding frequency coexistence criterion is met.

Specifically, the transmission module 75 is further adapted for determining that the first frequency is unavailable and reporting a response message indicating that the first frequency is an unavailable frequency to the database server when the first determination module 73 determines that the co-channel coexistence criterion is not met.

On the other hand, the transmission module 75 is further adapted for determining that the first frequency is unavailable and reporting the response message that the first frequency is an unavailable frequency to the database server when the determination result of the second determination module 74 is the corresponding frequency coexistence criterion is not met.

In specific implementation scenarios, the ranging module 72 is specifically adapted for doing at least one of the followings:

determining the first distance and other distances between the base station and base stations of incumbent systems using the corresponding frequencies based on signal power sensing; and determining the first distance and other distances between the base station and base stations of incumbent systems using the corresponding frequencies according to the information in the information database of a positioning system and the incumbent systems.

It is further noted that the base station further includes a storage module 76 for storing the information of the currently available spectrums of the base station and saving the information of the first frequency in the information of the currently available spectrums after the transmission module 75 determines that the first frequency is available.

In another specific application scenario, if during receiving the request message for introducing the cognitive system on the first frequency sent by the database server, the receiving module 71 also receives the request message for introducing the cognitive system on another frequency, the ranging module 72, the first determination module 73, the second determination module 74 and the transmission module 75 are further adapted for continuing to determine whether said another frequency is an available frequency after the transmission module 75 reports the response message indicating that the first frequency is an available frequency or the response message indicating that the first frequency is an unavailable frequency.

Figure 8:
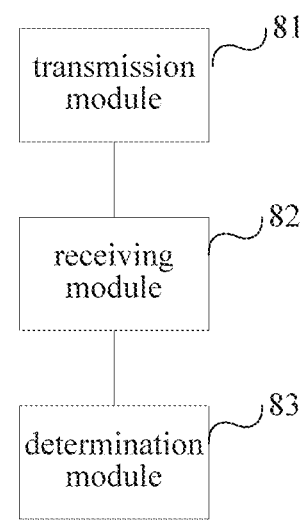
FIG. 8 is a structural diagram of a database server proposed in embodiments of the present invention.

Further, the embodiments of the present invention further proposes a database server, a structural diagram of which is as shown in FIG. 8 and which at least includes:

A transmission module 81 is adapted for sending a request message for introducing a cognitive system on a first frequency to a base station.

A receiving module 82 is adapted for receiving a response message returned by the base station.

A determination module 83 is adapted for determining whether the first frequency is an available frequency according to contents of the response message.

Further, the determination module 83 is further adapted for determining whether or not the first frequency is the last frequency and notifying the transmission module 81 to continue to send a request message for introducing the cognitive system on another frequency to the base station when it is determined that the first frequency is not the last frequency.

In this scenario, the determination module 83 is further adapted for terminating a determination process of available spectrums after determining that the first frequency is the last frequency.

In another specific application scenario, the transmission module 81 is further adapted for sending a request message for introducing the cognitive system on another frequency to the base station while sending the request message for introducing the cognitive system on the first frequency to the base station.

Accordingly, the receiving module 82 is further adapted for receiving response messages of corresponding other frequencies returned by the base station; the determination module 83 is further adapted for determining whether said other frequencies are available frequencies according to contents of the response messages of the corresponding other frequencies.

In practical application scenarios, the database server is specifically a functional unit of the base station itself, a functional unit of a central control unit of the cognitive system, or a separate server.

In contrast to the prior art, the technical solution proposed in the embodiments of the present invention has the following advantages:

By applying the technical solution of the embodiments of the present invention, with consideration on the bi-directionality of the interference between wireless communication systems, when introduction of the cognitive system is required, the corresponding frequency will be determined as an available frequency only in the case the incumbent system and the cognitive system can be simultaneously guaranteed to meet the corresponding coexistence criterion among the corresponding frequency and other frequencies near it, thus ensuring that the determined available frequency band guarantees that the normal operation of the incumbent system is not interfered by the cognitive system while ensuring that the newly-introduced cognitive system can also operate normally without interference of the incumbent system, thereby improving the communication quality of the wireless communication systems.

From the foregoing description of the embodiments, it will become readily apparent to those skilled in the art that the embodiments of the present invention may be implemented by hardware and may also be implemented by means of software plus a necessary general hardware platform. Based on such understanding, the technical solution of the embodiments of the present invention may be embodied as a software product, which may be stored in a non-volatile storage medium (which may be a CD-ROM, a U disk, a mobile hard disk, etc.,), which includes several instructions to allow a computer device (which may be a personal computer, a server, or a network-side device, etc.,) to implement the methods in various implementation scenarios of the embodiments of the present invention.

It will be appreciated by those skilled in the art that the drawings are only schematic diagrams of a preferred implementation scenario, and modules or flow charts in the drawings are not necessarily required for implementing the embodiments of the present invention.

It will be appreciated by those skilled in the art that modules in the apparatuses in the implementation scenarios may be distributed in the apparatuses of the implementation scenario according to the implementation scenario description and may also be accordingly varied and located in one or more apparatuses other than the present implementation scenario. The modules of the above implementation scenario may be combined into a single module and may be further split into a plurality of sub-modules.

The serial numbers of the embodiments of the present invention are only for the purpose of illustration and do not represent superior of the implementation scenarios.

The above disclosure are only several specific implementation scenarios of the embodiments of the present invention, however, embodiments of the present invention are not limited thereto, any change apparent to those skilled in the art should fall within service limit of the embodiments of the present invention.

What is claimed is:

1. A method for determining available spectrums comprising:

receiving, by a base station, a request message for introducing a cognitive system on a first frequency sent by a database server;

determining, by the base station, a first distance between the base station and a base station of an incumbent system using the first frequency and a second distance between the base station and a base station of an incumbent system using a second frequency adjacent to the first frequency;

determining, by the base station, according to the first distance, whether the cognitive system and the incumbent system operating on the first frequency meet a co-channel coexistence criterion, wherein the co-channel coexistence criterion includes that both the cognitive system and the incumbent system operating on the first frequency operate normally;

if it is determined that the co-channel coexistence criterion is met, determining, by the base station, according to the second distance, whether the cognitive system and the incumbent system operating on the second frequency meet a corresponding frequency coexistence criterion, wherein the corresponding frequency coexistence criterion includes that both the cognitive system and the incumbent system operating on the second frequency operate normally; and if it is determined that the corresponding frequency coexistence criterion is met, determining, by the base station, that the first frequency is available and reporting to the database server a response message indicating that the first frequency is an available frequency;

wherein the co-channel coexistence criterion or the correspondinq frequency coexistence criterion is specifically;

$$Dcr(n) > MAX(D1,D2):$$

wherein, Dcr(n) represents the distance between the base station and the base station of the incumbent system using the frequency n;

D1 represents the distance isolation required for the normal operation of the cognitve system when the base station of the incumbent system interferes with the base station of the cognitive system; and D2 represents the distance isolation required for the normal operation of the incumbent system when the base station of the cognitive system interferes with the base station of the incumbent system.

2. The method according to claim 1, wherein the method for the base station determining the first distance between the base station and the base station of the incumbent system using the first frequency and the second distance between the base station and the base station of the incumbent system using the second frequency adjacent to the first frequency specifically comprises at least one of:

determining, by the base station, based on signal power sensing, the first distance between the base station and the base station of the incumbent system using the first frequency and the second distance between the base station and the base station of the incumbent system using the second frequency; or, determining, by the base station, according to information in an information database of a positioning system and the incumbent systems, the first distance between the base station and the base station of the incumbent system using the first frequency and the second distance between the base station and the base station of the incumbent system using the second frequency.

3. The method according to claim 1, wherein after the base station determines that the first frequency is available, the method further comprises:

saving, by the base station, the first frequency in information of available spectrums.

4. The method according to claim 1, wherein after the base station reports to the database server the response message indicating that the first frequency is an available frequency, the method further comprises:

determining, by the database server, whether there is any other frequency whose availability needs to be determined; and if there is another frequency whose availability needs to be determined, continuing, by the database server, to send to the base station a request message for introducing the cognitive system on said another frequency.

5. The method according to claim 1, wherein while the base station receives the request message for introducing the cognitive system on the first frequency sent by the database server, the method further comprises:

receiving, by the base station, a request message for introducing the cognitive system on another frequency sent by the database server; and after reporting to the database server the response message indicating that the first frequency is an available frequency continuing, by the base station, to determine whether said another frequency is an available frequency.

6. A base station, comprising:

a processor and a non-transitory storage, wherein the non-transitory storage is to store one or more instructions to be executed by the processor, and the one or more instructions comprise:

a receiving instruction, to receive a request message for introducing a cognitive system on a first frequency sent by a database server;

a ranging instruction, to determine a first distance between the base station and a base station of an incumbent system using the first frequency and a second distance between the base station and a base station of an incumbent system using a second frequency adjacent to the first frequency after the receiving instruction receives the request message;

a first determination instruction, to determine whether the cognitive system and the incumbent system operating on the first frequency meet a co-channel coexistence criterion according to the first distance determined by the ranging instruction, wherein the co-channel coexistence criterion includes that both the cognitive system and the incumbent system operating on the first frequency operate normally;

a second determination instruction, to determine whether the cognitive system and the incumbent system operating on the second frequency meet a corresponding frequency coexistence criterion according to the second distance determined by the ranging instruction after the first determining instruction determines that the co-channel coexistence criterion is met, wherein the corresponding frequency coexistence criterion includes that both the cognitive system and the incumbent system operating on the second frequency operate normally; and a transmission instruction, to determine that the first frequency is available and to report a response message to the database server indicating that the first frequency is an available frequency when the second determination instruction determines that the corresponding frequency coexistence criterion is met;

wherein the co-channel coexistence criterion or the corresponding frequency coexistence criterion is specifically:

$Dcr(n) > MAX(D1, D2)$;

wherein, Dcr (n) resents the distance between the base station and the base station of the incumbent system using the frequency n;

D1 represent the distance isolation required for the normal operation of the cognitive system when the base station of the incumbent system interferes with the base station of the cognitive system; and D2 represents the distance isolation required for the normal operation of the incumbent system when the base station of the cognitive system interferes with the base station of the incumbent system.

7. The base station according to claim 6, wherein the ranging instruction is specifically to perform at least one of:

determining the first distance between the base station and the base station of the incumbent system using the first frequency and the second distance between the base station and the base station of the incumbent system using the second frequency based on signal power sensing; or, determining the first distance between the base station and the base station of the incumbent system using the first frequency and the second distance between the base station and the base station of the incumbent system using the second frequency according to information in an information database of a positioning system and the incumbent systems.

8. The base station according to claim 6, wherein the base station further comprises a storage instruction, to store information of currently available spectrums of the base station and to save information of the first frequency in the information of the currently available spectrums after the transmission instruction determines that the first frequency is available.

9. The base station according to claim 6, wherein if during receiving the request message for introducing the cognitive system on the first frequency sent by the database server, the receiving instruction further receives a request message for introducing the cognitive system on another frequency, the ranging instruction, the first determination instruction, the second determination instruction and the transmission instruction are further to continue to determine whether said another frequency is an available frequency after the transmission instruction reports to the database server the response message indicating that the first frequency is an available frequency.

* * * * *